United States Patent [19]

Derleth et al.

[11] Patent Number: 5,468,558
[45] Date of Patent: Nov. 21, 1995

[54] PROCESS FOR PREPARING FRACTURE-RESISTANT SOL/GEL PARTICLES

[75] Inventors: Helmut Derleth; Karl H. Bretz, both of Nienburg/Weser, Germany

[73] Assignee: Solvay Catalysts GmbH, Hanover, Germany

[21] Appl. No.: 61,313

[22] Filed: May 14, 1993

[30] Foreign Application Priority Data

May 22, 1992 [DE] Germany ............ 42 16 868.6

[51] Int. Cl.$^6$ .............. B32B 19/00; B01J 35/00; B01J 13/00
[52] U.S. Cl. ............ 428/402; 252/315.5; 252/315.6; 502/8; 502/9; 502/503; 502/504; 502/232; 428/404; 428/312.2; 428/312.6; 428/317.9; 428/323; 428/331
[58] Field of Search ............ 252/315.5, 315.6; 501/12; 502/8, 9, 503, 504, 232; 428/312.2, 312.6, 317.9, 323, 331, 402, 404

[56] References Cited

U.S. PATENT DOCUMENTS

| | | | |
|---|---|---|---|
| 2,885,366 | 5/1959 | Iler | 252/313 |
| 2,900,349 | 8/1959 | Schwartz | 252/317 |
| 2,964,481 | 12/1960 | Cramer et al. | 252/455 |
| 4,013,587 | 3/1977 | Fischer et al. | 252/448 |
| 4,090,887 | 5/1978 | Marquisee et al. | 106/288 B |
| 4,601,992 | 7/1986 | Derleth et al. | 502/64 |
| 4,978,640 | 12/1990 | Kelly | 501/32 |
| 5,122,291 | 6/1992 | Wolff et al. | 252/62 |
| 5,147,829 | 9/1992 | Hench et al. | 501/12 |

FOREIGN PATENT DOCUMENTS

| | | |
|---|---|---|
| 1473240 | 3/1967 | France . |
| 2917313 | 11/1980 | Germany . |
| 1171651 | 11/1969 | United Kingdom . |

OTHER PUBLICATIONS

Chemical Abstracts, *"Surface Chemistry and Colloids"*, vol. 68, No. 19, 99044 f (1968).
Chemical Abstracts, *"Eighth Collective Index"*, vol. 66–75, p. 206, (1967–1971).
Chemical Abstracts 115:120780u (1991).

*Primary Examiner*—Patrick J. Ryan
*Assistant Examiner*—Marie R. Macholl
*Attorney, Agent, or Firm*—Evenson, McKeown, Edwards & Lenahan

[57] ABSTRACT

A process for preparing fracture-resistant sol/gel particles which contain silicon dioxide, in which a highly disperse filler is added to the aqueous alkali metal silicate solution and/or the aqueous acid solution used in the preparation process.

10 Claims, No Drawings

PROCESS FOR PREPARING FRACTURE-RESISTANT SOL/GEL PARTICLES

BACKGROUND OF THE INVENTION

The present invention relates to a process for preparing sol/gel particles which contain silicon dioxide and fillers and have a high breaking strength.

Silicon dioxide particles are widely used, for example, as catalysts, catalyst supports, adsorbents, drying agents or ion exchangers. For most of these intended uses, particles which have a high breaking strength are required.

Spherical silicon dioxide particles are usually prepared by the known sol/gel process. According to this process, described for example in French Patent No. FR 1,473,240, a silicon dioxide hydrosol is prepared by mixing an aqueous solution of an alkali metal silicate with an aqueous solution of an acid. The resulting hydrosol is converted into drop-shaped particles and the drops are then gelled in a water-immiscible liquid or in air. In a subsequent process step, a so-called base exchange is then carried out, in which the alkali metal content of the spherical silicon dioxide hydrogel particles is decreased in an aqueous medium to less than 1% by weight, based on the dry substance. The particles are then washed, dried and tempered.

It is known that the water-resistance and porosity of silicon dioxide particles can be modified by introducing small amounts of fillers into the particles. For some intended uses, for example, it may be desirable to have an aluminium oxide filler in the silicon dioxide particles. Furthermore, the production costs of the silicon dioxide particles can be reduced by mixing in an inexpensive filler.

During preparation of the silicon dioxide particles, a filler is added in a known manner by admixing the filler with the aqueous solution of the alkali metal silicate and/or with the aqueous solution of the acid, from which the hydrosol is obtained by mixing. In the past, substances such as kaolin, montmorillonite, bentonite, zeolites, amorphous alumosilicates, starch or wood flour, for example, have been used as fillers.

The processes of the prior art have the disadvantage that, because a small amount of filler is precipitated into the silicon dioxide particles, the breaking strength of the particles is greatly reduced. A high proportion of broken sol/gel particles during the preparation process increases the production costs of the particles. Sol/gel particles having insufficient breaking strength also are hardly suitable for the intended uses mentioned above.

SUMMARY OF THE INVENTION

The object of the invention was therefore to provide a process which allows the preparation of fracture-resistant sol/gel particles which contain silicon dioxide and have fillers precipitated in them.

This and other objects of the invention are achieved by providing a process for preparing fracture-resistant sol/gel particles containing silicon dioxide, comprising combining an aqueous solution of an alkali metal silicate with an aqueous solution of an acid to produce a hydrosol, and converting said hydrosol into hydrogel particles in a water-immiscible liquid or in air, wherein prior to said combining step, a highly disperse filler is added to the solution of alkali metal silicate and/or the acid solution.

The objects are also achieved by providing sol/gel particles comprising a silicon dioxide matrix containing from 1 to 85% by weight of a highly disperse filler.

DETAILED DESCRIPTION OF PREFERRED EMBODIMENTS

It has now been found that fracture-resistant sol/gel particles containing silicon dioxide and precipitated fillers can be prepared if highly disperse substances are employed as the fillers.

The invention therefore relates to a process for preparing fracture-resistant sol/gel particles containing silicon dioxide by combining an aqueous solution of an alkali metal silicate with an aqueous solution of an acid, converting the resulting hydrosol into hydrogel particles in a water-immiscible liquid or in air and treating the hydrogel particles in accordance with the subsequent treatment stages of the sol/gel process, characterized in that highly disperse fillers are added to the alkali metal silicate solution and/or to the acid solution.

Sodium silicate solution is usually employed as the aqueous solution of an alkali metal silicate in the sol/gel process. All the acid solutions which are customarily used in the sol/gel process, for example aqueous $H_2SO_4$ or aqueous HCl solution, can be employed as the aqueous solution of an acid. Further constituents, for example aluminium salts or magnesium salts, can also be added to the silicon dioxide source and/or to the acid source, so that in the context of the invention, the term "sol/gel particles containing silicon dioxide" is understood to also include silicates containing foreign ions which can be prepared by the sol/gel process, such as, for example, alumosilicates. The nature and amount of any additional components may be varied within wide limits, depending on the intended use.

The hydrosol can be converted into hydrogel particles in a known manner in air by the air precipitation method or in a water-immiscible liquid by the oil drop method. As used herein, the term "water-immiscible liquids" is understood to refer to forming oils which are customarily used in the sol/gel process and have a higher or lower specific gravity than the particles introduced. Mineral oil, crude petroleum or kerosene is usually used as the forming oil.

According to the subsequent treatment stages of the sol/gel process which are known per se, the alkali metal content of the hydrogel particles prepared according to the invention may be decreased to less than 1% by weight, based on the dry substance, in an aqueous medium. The hydrogel particles are then converted into sol/gel particles according to the invention by drying and tempering them in a known manner.

It is preferred to use highly disperse fillers in the process of the invention which have a particle size of from 1 to 50 nm, in particular from 1 to 20 nm.

Suitable highly disperse fillers include, in particular, highly disperse inorganic compounds selected from the group consisting of silicic acids, alumosilicates, aluminium oxides and titanium dioxide. Such highly disperse products are generally known and commercially obtainable. The aforementioned highly disperse fillers are substances which are prepared either by flame, arc or plasma hydrolysis of compounds or by grinding precipitated precursors obtainable by wet processes. Aerogels which have been obtained by supercritical drying of organogels can also be employed. Examples of highly disperse silicic acids obtained by flame, arc or plasma processes include, inter alia, the products which are based on silicon dioxide and are obtainable from Degussa under the name Aerosil™ in particular Aerosil™ 90, 130, 150, 200, 300, 380, OX50, TT600, MOX80, MOX170, COK8, R202, R85, R812, R972 and R974, or the silicic acids FK320, FK700, Sipemat™ 22 and Sipemat™ D17 obtainable from Degussa. An example of a highly disperse aluminium silicate is the aluminium silicate P820 (Degussa). An example of a highly disperse aluminium oxide is aluminium oxide C (Degussa); an example of a highly disperse titanium dioxide is titanium dioxide P25 (Degussa).

In the process according to the invention, the highly disperse fillers are added in an amount of 1 to 85% by weight, preferably 1 to 60% by weight, based on the total solids content of the solutions employed.

The highly disperse fillers can be added in the process according to the invention either to the alkaline $SiO_2$-containing component used, for example aqueous sodium silicate solution, or to the acid component used, for example aqueous sulfuric acid solution. Of course, the process according to the invention can also be carried out using a procedure in which both the alkaline $SiO_2$-containing component and the acid component contain the highly disperse fillers.

If high concentrations of highly disperse filler are to be achieved, the component to which the solid has been added can be ground in a known bead mill before further processing, in order to achieve better mixing. If the solids concentrations, based on the total solids content, are above 50% the mixing of the alkaline component with the acid component to form a hydrosol is advantageously carried out in a mixing nozzle which is known per se. In order to achieve more intimate mixing of the individual components, a two-component mixing nozzle having a spiral inlet (spiral mixing nozzle) is preferably used. Such spiral mixing nozzles are commercially available.

In addition to the highly disperse fillers, other fillers which are not highly disperse, for example kaolin, montmorillonite, bentonite, precipitated silicic acids, aluminium oxides, zeolites or amorphous alumosilicates, can of course also be employed in the process according to the invention. Known porosity agents, such as, for example, starch or wood flour, can also be added. The content of highly disperse fillers with respect to the total amount of filler employed should be 1 to 85% by weight, preferably 25 to 80% by weight, based on the total filler content.

The process is preferably carried out in such a way that spherical sol/gel particles are obtained. This can be achieved by converting the hydrosol obtained by bringing together the aqueous solution of the alkali metal silicate and the aqueous solution of the acid into drop-shaped hydrosol particles, which then gel to spherical particles by the air precipitation method on falling through a 30 m column of air. The oil drop method is carried out, for example, by combining the starting solutions via a mixing nozzle, and in the case of high solids concentrations optionally via a mixing nozzle having a spiral inlet, and introducing the mixture from this mixing nozzle in a thin jet via a precipitating cone into a forming oil. By maintaining predetermined concentration limits which are known per se, one is able to obtain a mixture which only coagulates when the jet of liquid introduced into the forming oil has disintegrated into separate drops.

One advantage of the process according to the invention is the ability to prepare water-resistant and porous sol/gel particles containing precipitated filler and having a surprisingly high breaking strength. The fact that the use of highly disperse fillers in the process according to the invention leads to an improvement in the breaking strength of the particles prepared is surprising and could not have been expected or predicted by a person of ordinary skill.

In the context of the present invention, the term "high breaking strength" for individual spherical sol/gel particles prepared by the process of the invention is understood to mean an individual breaking strength of at least 2 kg at a sphere diameter of 1 to 2 mm, 4 kg at a sphere diameter of 2 to 3 mm, 8 kg at a sphere diameter of 3 to 4 mm, 9 kg at a sphere diameter of 4 to 5 mm, and 10 kg at a sphere diameter of 5 to 6 mm (measured with a bursting pressure measuring instrument produced by the Zwick Company). By incorporating highly disperse fillers, the bursting pressure of the sol/gel particles is thus increased in an advantageous manner.

In addition to their outstanding breaking strength, another advantage of the sol/gel particles prepared by the process according to the invention is their high water resistance. In the context of the invention, particles having improved water resistance are understood as meaning those sol/gel particles which have a water resistance of at least 70%. The water resistance of the spherical sol/gel particles prepared by the process according to the invention is determined here by a standard test method, in which 100 spherical sol/gel particles are sprayed continuously with water in a volume of 5 times the volume of the 100 spherical sol/gel particles on a cup of 25 cm diameter rotating at 20 revolutions per minute under an angle of 45°. The particles are then dried and the number of particles which show cracks or have disintegrated is determined. The water resistance of the spherical sol/gel particles is expressed as the percentage by weight of particles which have not been damaged during contact with water.

The sol/gel particles which are prepared according to the invention and have highly disperse fillers precipitated in them can be used, for example, as catalysts, catalyst supports, adsorption agents, drying agents or ion exchangers. They are particularly suitable as support materials for catalysts containing one or more catalytically active metals, such as are employed, for example, in chemical or petrochemical processes.

EXAMPLES

Examples 1–6

Preparation of fracture-resistant sol/gel particles containing precipitated fillers.

Example 1

An acid solution and an alkaline silicate solution having the concentrations shown in Table 1 were in each case prepared separately, and the mashes likewise mentioned in Table 1 were added to form the starting components.

TABLE 1

Composition of the starting solutions and starting components according to Example 1.

| Acid solution AcS: | $H_2SO_4$: | 15.20% by weight |
| --- | --- | --- |
| | $H_2O$: | 84.80% by weight |
| | $d_{20}$: | 1.106 g/ml |
| Aerosil mash AM: | Aerosil ™200: | 10.00% by weight |
| | $H_2O$: | 90.00% by weight |
| | $d_{20}$: | 1.055 g/ml |

TABLE 1-continued

Composition of the starting solutions and starting components according to Example 1.

| $\phi = V_{AM}:VX_{AcS} = 1.78$ | | |
|---|---|---|
| Acid component AcC: | $H_2SO_4$: | 5.63% by weight |
| | Aerosil™200: | 6.30% by weight |
| | $H_2O$: | 88.07% by weight |
| | $d_{20}$: | 1.071 g/ml |
| Alkaline solution AlS: | $Na_2O$: | 5.88% by weight |
| | $SiO_2$: | 19.11% by weight |
| | $H_2O$: | 75.01% by weight |
| | $d_{20}$: | 1.235 g/ml |
| $SiO_2$ mash MJ: | $SiO_2$: | 21.40% by weight |
| ($SiO_2$ beads homogenized in a jet mill, Cilas $d_{50} = 3.8$ micron) $\phi' = V_{MJ}:V_{AlS} = 0.395$ | $H_2O$: | 78.60% by weight |
| | $d_{20}$: | 1.138 g/ml |
| Alkaline component AlC: | $Na_2O$: | 4.31% by weight ($SiO_2$ mash) |
| | $SiO_2$: | 5.71% by weight |
| | | 14.01% by weight (water-glass) |
| | $H_2O$: | 75.97% by weight |
| | $d_{20}$: | 1.209 g/ml |

Notes to Table 1:
$d_{20}$: density at 20° C.
$\phi$ and $\phi'$: volume ratio

A highly disperse silicic acid (Aerosil™200; particles size about 12 nm) was employed as the highly disperse filler.

The acid component AcC and the alkaline component AlC were mixed at temperatures between 9° and 11° C. via a mixing nozzle, and the mixture was immediately introduced in a thin jet into a forming oil (mineral oil). The resulting mixtures coagulated in droplet form in the forming oil. Because of the lower specific gravity of the forming oil, the particles dropped into the aqueous solution underneath and were discharged by this. In accordance with the process stages of the sol/gel process which are known per se, an ageing process in the aqueous solution and a base exchange to decrease the alkali metal content of the particles were then carried out. More detailed conditions of the individual process steps of ageing in the aqueous solution, base exchange and washing are shown in Table 2.

TABLE 2

Work-up of coagulates according to Example 1.

| Precipitation: | pH 6.9 |
|---|---|
| Aqueous Solution: | 11° C. |
| Circulation Time: | 6 hours |
| Ageing: | 8 hours (from start of precipitation to the end of ageing) 16° C. |

TABLE 2-continued

Work-up of coagulates according to Example 1.

| Base exchange solution: in each case | 0.5% strength $(NH_4)_2SO_4$ solution |
|---|---|
| Base exchange, cold: | 10 hours 16° C. |
| Base exchange, warm: | 12 hours 25° C. |
| Washing (until free from sulfate): | 30 hours 25 hours |

The process products were then uniformly dried at 180° C. for 5 hours and tempered at 400° C. for 2 hours. Beads 3.5 to 5 mm in diameter were produced having the compacted apparent density, surface area, pore volume and bursting pressure shown in Table 3.

TABLE 3

Properties of products according to Example 1.

| Particle size: | 3.5–5.5 mm |
|---|---|
| Bulk density, dried: | 0.42 g/ml |
| Bulk density, conditioned: | 0.41 g/ml |
| Bursting pressure***: | 14 kg |
| Pore volume**: | 1.01 ml/g |
| Specific surface area*: | 334 m²/g |

*measured by the Haul/Dümbgen method
**calculated from the true and apparent density
***mean value of 25 measurements with a bursting pressure apparatus produced by Zwick Company.

EXAMPLES 2–6

The starting solutions and starting components having the compositions shown in Table 4 were employed in Examples 2 to 6. Because of the higher content of highly disperse filler in the acid component AcC, this was homogenized with the Aerosil mash AM in a bead mill (Drais PM50) at 9° C. The acid component AcC was then mixed together with the alkaline solution AlS at 9° C. in a mixing nozzle having a spiral inlet (manufactured by Bete Fog Nozzle Inc., Greenfield, USA). The other process steps were carried out as already described in Example 1. Table 4 furthermore shows the amount of highly disperse filler, based on the total solids content.

The products of the process were uniformly dried at 180° C. for 4 hours and then tempered at 600° C. for 4 hours.

The individual working-up steps are shown in Table 5. The properties of the resulting products of the process are shown in Table 6.

TABLE 4

Composition of starting solutions and starting components of Examples 2 through 6

| Example | | | 2 | 3 | 4 | 5 | 6 |
|---|---|---|---|---|---|---|---|
| Acid solution AcS | $H_2SO_4$ | % by weight | 27.00 | 27.00 | 96.00 | 96.00 | 96.00 |
| | $H_2O$ | % by weight | 73.00 | 73.00 | 4.00 | 4.00 | 4.00 |
| | $d_{20}$ | g/ml | 1.197 | 1.197 | 1.841 | 1.841 | 1.841 |
| Aerosil mash AM | Aerosil® 200 | % by weight | 10.00 | 10.00 | 10.00 | 10.00 | 15.00 |
| | $H_2O$ | % by weight | 90.00 | 90.00 | 90.00 | 90.00 | 85.00 |
| | $d_{20}$ | g/ml | 1.054 | 1.054 | 1.054 | 1.054 | 1.081 |
| $f = V_{AM}:V_{AcS}$ | | | 6.452 | 6.452 | 53.452 | 83.018 | 94.515 |
| Acid component AcC | $H_2SO_4$ | % by weight | 4.04 | 4.04 | 3.04 | 1.98 | 1.70 |
| | Aerosil ™200 | % by weight | 8.50 | 8.50 | 9.68 | 9.79 | 14.73 |
| | $H_2O$ | % by weight | 87.46 | 87.46 | 87.28 | 88.23 | 83.57 |

TABLE 4-continued

Composition of starting solutions and starting components of Examples 2 through 6

| Example | | | 2 | 3 | 4 | 5 | 6 |
|---|---|---|---|---|---|---|---|
| Alkaline solution AlS | $d_{20}$ | g/ml | 1.073 | 1.073 | 1.069 | 1.063 | 1.089 |
| | $Na_2O$ | % by weight | 5.00 | 5.00 | 4.80 | 4.80 | 6.00 |
| | $SiO_2$ | % by weight | 16.80 | 16.80 | 16.10 | 16.10 | 20.16 |
| | $H_2O$ | % by weight | 78.20 | 78.20 | 79.10 | 79.10 | 73.84 |
| | $d_{20}$ | g/ml | 1.185 | 1.185 | 1.171 | 1.171 | 1.255 |
| $F = V_{AcC}:V_{AlS}$ | | | 2.182 | 2.182 | 2.734 | 4.224 | 6.308 |
| Content of Aerosil | $SiO_2$ | % by weight | 50 | 50 | 60 | 70 | 80 |
| Content of $SiO_2$ from water-glass | $SiO_2$ | % by weight | 50 | 50 | 40 | 30 | 20 |

TABLE 5

Working up of the coagulates according to Example 2 to 6

| Example: | | 2 | 3 | 4 | 5 | 6 |
|---|---|---|---|---|---|---|
| Precipitation | pH | 9.5 | 9.0 | 8.6 | 8.6 | 8.8 |
| Aqueous Solution | °C. | 11.0 | 11.0 | 11.0 | 11.0 | 11.0 |
| Circulating time | hours | 6.0 | 6.0 | 6.0 | 6.0 | 6.0 |
| Ageing | °C. | 16.0 | 16.0 | 16.0 | 16.0 | 16.0 |
| | hours | 12.0 | 4.0 | 4.0 | 4.0 | 4.0 |
| Concentration of the base exchange solution $(NH_4)_2SO_4$ | % | 0.5 | 0.5 | 0.5 | 0.5 | 0.5 |
| Base exchange, cold | hours | 10.0 | 10.0 | 10.0 | 10.0 | 10.0 |
| | °C. | 16.0 | 16.0 | 16.0 | 16.0 | 16.0 |
| Base exchange, warm | hours | 16.0 | 16.0 | 16.0 | 16.0 | 16.0 |
| | °C. | 25.0 | 25.0 | 25.0 | 25.0 | 25.0 |
| Washing (until free from sulfate) °C. | hours | 25.0 | 25.0 | 18.0 | 13.0 | 12.0 |
| | | 25.0 | 25.0 | 25.0 | 25.0 | 25.0 |

TABLE 6

Properties of the process products according to Examples 2 to 6

| Example: | | 2 | 3 | 4 | 5 | 6 |
|---|---|---|---|---|---|---|
| Particle size | mm | 3.5–5.5 | 3.5–5.5 | 3.5–5.5 | 5.0 | 5.0 |
| Bulk density, dried | g/ml | 0.50 | 0.46 | 0.45 | 0.40 | 0.38 |
| Bulk density, conditioned | g/ml | 0.55 | 0.50 | 0.49 | 0.46 | 0.42 |
| Bursting pressure*** | kg | >20.0 | 15.5 | 16.0 | 17.2 | 10.8 |
| Pore volume** | ml/g | 0.69 | 0.78 | 0.80 | 0.80 | 0.98 |
| Specific surface area* | m²/g | 494 | 183 | 272 | 260 | 247 |
| Average pore diameter | Å | 56 | 171 | 118 | 123 | 159 |

*measured by the Haul/Dümbgen method
**calculated from the true and apparent density
***measured with a bursting pressure apparatus from Zwick, mean value from 25 measurements

EXAMPLE 7

Further processing of the sol/gel particles of the invention to give a catalyst for hydration of an olefin to an alcohol.

The sol/gel particles prepared according to Example 1 were used as catalyst supports to prepare a catalyst for hydration of olefins to alcohols. For this, 500 ml of the sol/gel particles prepared according to the invention were immersed in a solution comprising 30% by weight of $H_3PO_4$, 7.5% by weight of $H_2O$ and 52.5% by weight of ethanol and allowed to stand for 2 hours. The particles were then allowed to drain and were dried at about 180° C. for 12 hours. 94.8% of the particles were present in the form of whole beads having a bursting pressure of 12.9 kg.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations falling within the scope of the appended claims and equivalents thereof.

What is claimed is:

1. A process for preparing fracture-resistant sol/gel particles containing silicon dioxide, said process comprising combining an aqueous solution of an alkali metal silicate with an aqueous solution of an acid to produce a hydrosol, converting said hydrosol into hydrogel particles in a water-immiscible liquid or in air, and drying and tempering the hydrogel particles under conditions to convert them into sol/gel particles having a pore volume of at most 1.01 ml/g, wherein prior to said combining step a filler having a particle size of from 1 to 50 nm is added to at least one of said solution of an alkali metal silicate and said solution of an acid, said filler being added in an amount of from 1 to 85% by weight, relative to the total solids content of the combined solutions, whereby said filler is incorporated in said sol/gel particles.

2. A process according to claim 1, further comprising subjecting said hydrogel particles to at least one subsequent treatment selected from the group consisting of ageing and base exchange, prior to drying and tempering.

3. A process according to claim 1, wherein said filler has a particle size of from 1 to 20 nm.

4. A process according to claim 1, wherein said filler is an inorganic compound selected from the group consisting of solid silicic acid particles, alumosilicates, aluminium oxides and titanium dioxide.

5. A process according to claim 4, wherein said highly disperse filler is silicic acid particles obtained by flame, arc or plasma hydrolysis.

6. A process according to claim 1, wherein sol/gel particles are produced having a matrix of silicon dioxide.

7. A process according to claim 8, wherein said highly disperse filler is added in an amount of from 25 to 80% by weight, relative to the total solids content of the combined solutions.

8. A process according to claim 1, wherein said sol/gel particles are obtained as spherical particles.

9. Sol/gel particles having particle diameters of from 1 to 6 mm and comprising a silicon dioxide matrix, said particles containing from 1 to 85% by weight, relative to the total solids content of the sol/gel particles, of a filler having a particle size of from 1 to 50 nm, and wherein said particles have a pore volume of at most 1.01 ml/g.

10. Sol/gel particles according to claim 9, wherein said particles have individual breaking strengths of at least:
- 2 kg at a sphere diameter of 1 to 6 mm,
- 4 kg at a sphere diameter of 2 to 6 mm,
- 8 kg at a sphere diameter of 3 to 6 mm,
- 9 kg at a sphere diameter of 4 to 6 mm, and
- 10 kg at a sphere diameter of 5 to 6 mm.

* * * * *